(12) United States Patent
Cauchy et al.

(10) Patent No.: US 9,412,145 B2
(45) Date of Patent: *Aug. 9, 2016

(54) SYSTEM AND METHOD FOR PROCESSING DIGITAL DATA

(71) Applicant: STMICROELECTRONICS (GRENOBLE 2) SAS, Grenoble (FR)

(72) Inventors: Xavier Cauchy, Laval (FR); Anthony Philippe, Jarrie (FR); Isabelle Faugeras, La Murette (FR); Didier Siron, Chevrieres (FR)

(73) Assignee: STMICROELECTRONICS (GRENOBLE 2) SAS, Grenoble (FR)

( * ) Notice: Subject to any disclaimer, the term of this patent is extended or adjusted under 35 U.S.C. 154(b) by 467 days.

This patent is subject to a terminal disclaimer.

(21) Appl. No.: 14/013,075

(22) Filed: Aug. 29, 2013

(65) Prior Publication Data

US 2013/0342763 A1 Dec. 26, 2013

Related U.S. Application Data

(63) Continuation of application No. 12/707,451, filed on Feb. 17, 2010, now Pat. No. 8,527,683.

(30) Foreign Application Priority Data

Feb. 18, 2009 (FR) ...................... 09 51066

(51) Int. Cl.
*G06T 1/20* (2006.01)
*G06F 9/38* (2006.01)
*G06F 13/40* (2006.01)

(52) U.S. Cl.
CPC ............... *G06T 1/20* (2013.01); *G06F 9/3877* (2013.01); *G06F 9/3885* (2013.01); *G06F 13/4022* (2013.01); *G06F 2213/0038* (2013.01)

(58) Field of Classification Search
CPC ......... G06F 13/00; G06F 13/12; G06F 13/14; G06F 13/20; G06F 13/36; G06F 13/362; G06F 13/38; G06F 13/40; G06F 13/4004; G06F 13/4022; G06F 13/42; G06F 15/76; G06F 15/78; G06F 15/7807; G06F 15/7839; G06F 15/7842; G06F 15/80; G06F 9/38; G06F 9/3877; G06F 9/3885; G06F 9/3887; G06F 9/3889; G06F 9/3891; G06F 9/3893; G06F 9/4405; G06F 2213/0038; H04N 19/00; G06T 1/20
See application file for complete search history.

(56) References Cited

U.S. PATENT DOCUMENTS 6,029,239 A   2/2000  Brown
6,209,078 B1  3/2001  Chang et al.
6,477,606 B1 * 11/2002  Kawamura ............ G06F 13/423
                                                    326/31

(Continued)

FOREIGN PATENT DOCUMENTS

EP           1860571        11/2007

OTHER PUBLICATIONS

"Low-cost QPSK demodulator and MPEG2 decoder for set-top box appliations". STi5189. Revision 2. STMicroelectronics. Mar. 2009. Document ID 15458.*

(Continued)

*Primary Examiner* — Thomas J Cleary
(74) *Attorney, Agent, or Firm* — Allen, Dyer, Doppelt, Milbrath & Gilchrist, P.A.

(57) ABSTRACT

This system for processing digital data may include a set of slave processing units for the execution of elementary functions, an interconnection module, which is designed to communicate with a data transfer network and to transfer data between the processing units, on the one hand, and the data transfer network, on the other hand, and a controller controlling the interconnection module to control the data transfer.

30 Claims, 6 Drawing Sheets

(56) References Cited

U.S. PATENT DOCUMENTS

| | | |
|---|---|---|
| 7,701,943 B2 | 4/2010 | Harris et al. |
| 7,970,977 B1 * | 6/2011 | Li .................... G06F 13/4036 710/306 |
| 8,259,121 B2 | 9/2012 | Law et al. |
| 8,307,416 B2 | 11/2012 | Conti |
| 8,527,683 B2 * | 9/2013 | Cauchy .............. G06F 13/4022 345/506 |
| 2003/0151608 A1 * | 8/2003 | Chung .................... G06T 1/20 345/506 |
| 2005/0198413 A1 * | 9/2005 | Moyer .................. G06F 13/385 710/35 |
| 2008/0163353 A1 * | 7/2008 | Conti .................. G06F 12/1483 726/11 |

OTHER PUBLICATIONS

"STB decoders with integrated demodulation and IP capability". ST Microelectronics. Aug. 2008.*

Sohn et al., "Design and test of fixed-point multimedia co-processor for mobile applications", IEEE vol. 2, Mar. 2006, pp. 1-5.

* cited by examiner

SYSTEM AND METHOD FOR PROCESSING DIGITAL DATA

FIELD OF THE INVENTION

The invention relates generally to the processing of digital data and relates, more particularly, to the processing of video image pixels.

BACKGROUND OF THE INVENTION

Figure 1:
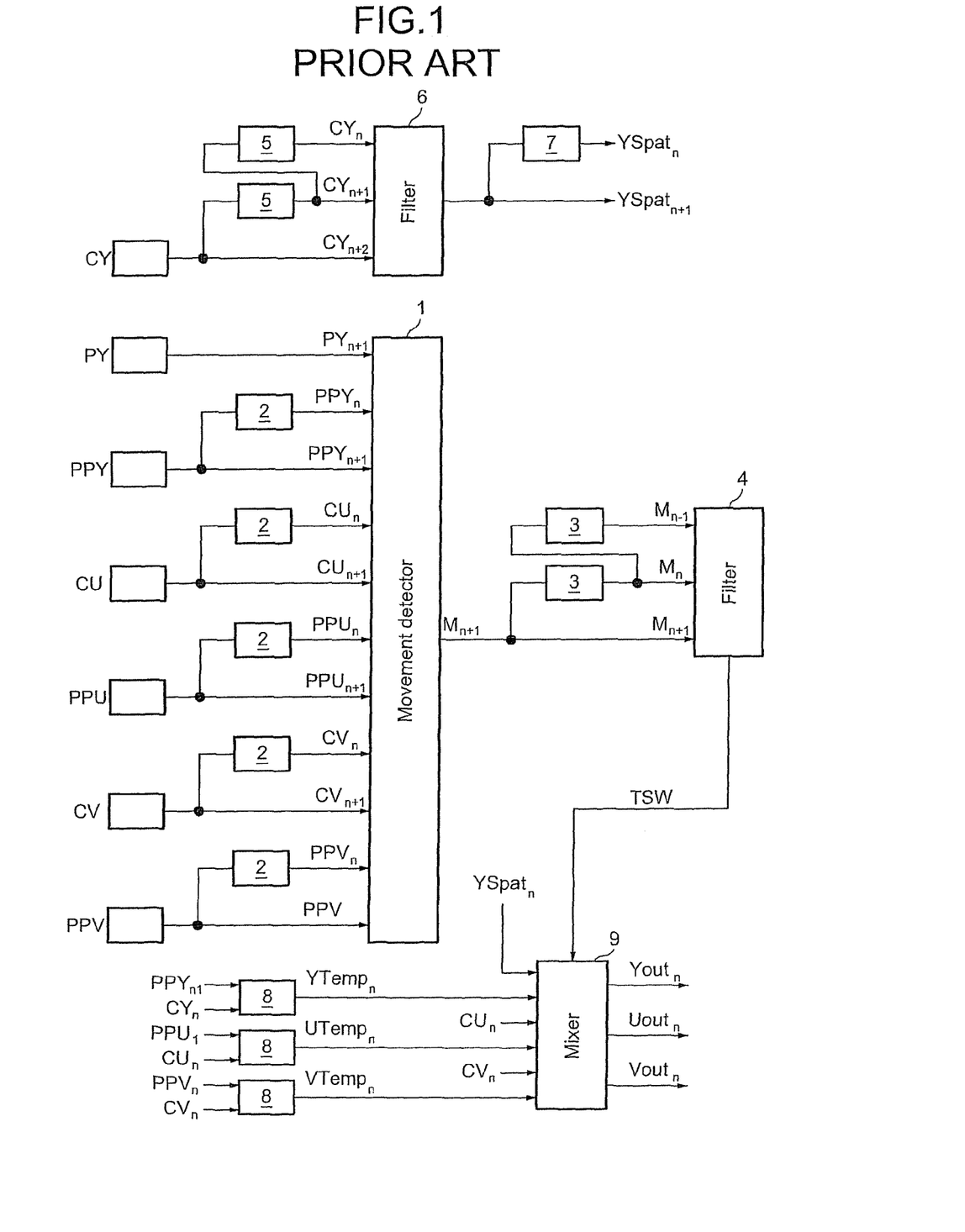
FIG. 1 illustrates the general architecture of an example of a typical method for reducing time noise applied within a video processor, according to the prior art.

In the context of the processing of video image pixels, it often happens that the data to be processed is stored in buffer memories and is then retrieved to undergo successive digital processing. This is particularly the case with time noise reduction, which is used to reduce the recursive time noise in a noisy video signal. FIG. 1 shows a flow chart of such a time noise reduction method.

This algorithm is essentially based on a space interpolation and on a time interpolation of the pixels. A movement detector is used to decide whether space interpolation or time interpolation may be preferred. The end result is obtained by weighting the space and time interpolations according to the detected movement.

In FIG. 1, the prefix Y designates the luminance component and the prefixes U and V designate the chrominance components of a frame, the prefix C designates a current frame, the prefix P designates a preceding frame, the prefix PP designates a frame immediately prior to the preceding frame, the suffix "n" designates a line "n" of a frame, and the suffix "n+1" designates a subsequent line. The luminance components PY and PPY and the chrominance components CU, PPU, CV and PPV of a preceding frame P and of a prior frame PP are presented at the input of a movement detector 1.

More particularly, the luminance component $PY_{n+1}$ of a subsequent line of a prior frame P, the luminance component PPYn of a line n of a prior frame PP, obtained by way of a delay line, such as 2, and the luminance component $PPY_{n+1}$ of a subsequent line of a frame PP are presented at the input of the movement detector 1. With reference to the chrominance components U and V, the chrominance components of a line n and of a subsequent line n+1 of a current frame C and of a prior frame PP, that is to say the components $CU_n$, $CU_{n+1}$, $PPU_n$, $PPU_{n+1}$, $CV_n$, $CV_{n+1}$, $PPV_n$ and $PPV_{n+1}$, are also presented at the input of the movement detector 1.

The value of the movement $M_{n+1}$, originating from the movement detector 1, and the prior movement values $M_n$ and $M_{n-1}$, obtained by way of delay lines, such as 3, are presented at the input of a filter 4 delivering a weighted coefficient TSW. Moreover, the luminance signal CY of a current frame, of a current line n+2 and of prior lines n+1 and n, originating from corresponding delay lines, such as 5, is the subject of space filtering by way of a corresponding filter 6, so as to obtain a luminance value on a sliding window. A delay line 7 makes it possible to have, at the output of the space filtering, components $YSpat_{n+1}$, and $YSpat_n$ on two consecutive lines.

Moreover, the luminance and chrominance values of a current frame C and of a prior frame PP are presented at the input of respective time filters, such as 8. The filtered values of the luminance and chrominance components $YTemp_n$, $UTemp_n$ and $VTempp_n$ are presented, with the filtered component $YSpat_n$ and with the weighted coefficient TSW, at a mixer stage 9 in order to supply, as an output, luminance and chrominance components $Yout_n$, $Uout_n$ and $Vout_n$ weighted according to the detected movement.

As can be understood, such processes are relatively cumbersome to apply. This is also the case with the various digital processes, which may be applied to video signals, such as the luminance and chrominance separation processes, the change of resolution or "rescaling" processes, the de-interlacing processes, the subjective image improvement processes, such as the processes known as LTI/CTI, DC, i.e. the color-management processes.

As described above with respect to the reduction of time recursive noise, the various processes are usually applied over a sliding window, which takes account of a set of adjacent pixels. These processes therefore use iterative computations and usually involve the use of buffer memories to retain the components of the adjacent lines, and even of the preceding frames. Various approaches are typically used to apply processes of the aforementioned type to video digital signals.

First of all, there are purely hardware approaches. Such approaches may be advantageous to the extent that they make it possible to obtain good performance. But it is understandable that the use of hardware methods may make the process inflexible and difficult to change. Moreover, the use of hardware implementations may use low-level coding, such as the coding known as Register Transfer Level (RTL), which are relatively cumbersome to use. Finally, the use of hardware implementations use a wired control logic that may be relatively difficult to design and may be capable of generating errors.

There are, beside the hardware approaches, purely software approaches. Such approaches may be relatively flexible but may also generate prohibitive production costs. Finally there are approaches that include combining the hardware approaches and the software solutions. Such approaches may include providing coprocessors combined by way of a wired architecture. Such coprocessors may be complex, and each may incorporate a control logic using direct memory access (DMA) and have the same disadvantages as those of the purely hardware solutions. They may also be difficult to control. They may also be difficult to model so that, at the design stage, their performance is relatively difficult to predict.

SUMMARY OF THE INVENTION

In view of the foregoing, according to a first aspect, a system for processing digital data may comprise a set of slave processing units for the execution of elementary functions, an interconnection module, which is designed to communicate with a data transfer network and to transfer data between the processing units, on the one hand, and the data transfer network, on the other hand, and a unit for controlling the interconnection module in order to control the data transfer.

According to another feature of this system, the set of processing units may comprise a set of programmable units and a set of non-programmable hardware units. In one embodiment, the system also may comprise a shared memory associated with the programmable processing units. In another embodiment, the shared memory may be an internal memory to the programmable processing units.

According to yet another embodiment of the system for processing digital data, the interconnection module may comprise means or a control unit for disabling the processing units that are not in demand. For example, the interconnection module may comprise means for inserting or a module for inserting into a signal transmitted to a processing unit an active flag for a current transaction. The system may comprise means for disabling the processing units if there is no active flag or the control unit may perform the disabling.

In one embodiment, the set of processing units may comprise groups of slave processing units with non-simultaneous action, the system comprising means for multiplexing or a multiplexer the slave processing units of the groups. For example, the interconnection module may comprise means for inserting, into a signal transmitted to each group of processing units, a configuration signal of the group.

The system may also comprise several groups in parallel of sets of processing units, each associated with a local memory and with a local interconnection module. In one embodiment, the data may comprise multimedia data.

According to another aspect is directed to a satellite or cable television signal decoder comprising a system as defined above. Yet another aspect is directed to a television set comprising a system as defined above.

Finally, according to the present description, a method for processing digital data may comprise the steps of transferring the data to be processed between a data transfer network and a set of processing units executing elementary functions, under the control of a control unit.

Other objects, features and advantages of such a system and of such a method may appear on examination of the following description, given only as a non-limiting example, and made with reference to the appended drawings, in which:

DETAILED DESCRIPTION OF THE PREFERRED EMBODIMENTS

Figure 2:
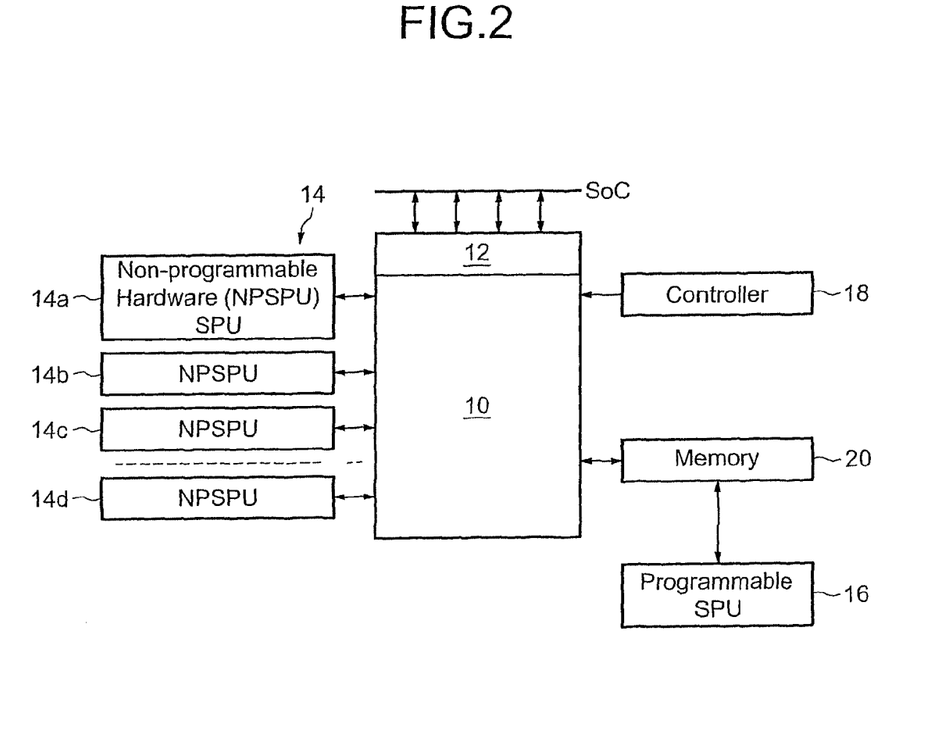
FIG. 2 illustrates the general architecture of a system for digitally processing data, according to the present invention.

With reference to FIG. 2, the general architecture may be described of an exemplary embodiment of a system for processing digital data. In the exemplary embodiment illustrated, this system is designed for the processing of video data pixels. But, as indicated above, there is no departure from the context of the present description when such a system is designed for the processing of data of another kind, such as audio data. In that case, the processes used are applied to audio samples instead of to video frame pixels.

As can be seen, in the exemplary embodiment shown, the system is designed to communicate with a data transfer network of the system-on-chip (SoC). The digital processes used within such a system may be of various kinds. They may, for example, as explained above, include using a time noise reduction, a 3D filtering in order to achieve a luminance/chrominance separation, a change of resolution or "rescaling", a de-interlacing, a subjective image improvement process of the LTI/CTI, DCI, etc., type, a color-management algorithm, etc. or, in general, any type of video process being applied to the pixels of a video image.

As is seen in FIG. 2, the architecture of the processing system is based on a separation of the control means or the controller, which are used for the transfer of data received from the transfer network SoC and the processing means or the processor themselves, which process the received pixels.

Therefore the system comprises: an interconnection module 10 which communicates with the network SoC via specific interfaces 12; a set of slave processing units, such as 14 and 16, which each execute elementary functions on a pixel stream; a control unit 18, which controls the data transfer between the network SoC, on the one hand, and the processing units 14 and 16 on the other hand; and a common on-board memory 20 for the set of processing units. Therefore, the interconnection module 10 and the control module 18 are responsible for the transfer of data to the processing units and the addressing of the data in the memory 20.

For example, the interconnection module 10 is produced around a DMA controller optimized for a video application and comprising all the appropriate interfaces for communicating with the processing units 14 and 16. In other words, the interconnection module 10 performs a data transfer engine the function of which is essentially to transfer pixels to the processing units and to receive pixels from these processing units and to do so, preferably, with minimal intervention of the control unit 18.

The processing units comprise, on the one hand, a set of processing units based on hardware that are essentially non-programmable, referenced 14-$a$, 14-$b$, 14-$c$, ... 14-$n$ and a set of programmable processing units referenced 16. With respect to the non-programmable control units 14-$a$, ..., 14-$n$, the latter carry out most of the intensive processes on the pixel streams. They have essentially no wired control logic and carry out a sequence of cascaded operations on the incident pixels, such as filtering, adding, detecting contours, etc. The programmable processing units 16 carry out more occasional processes. They are designed to supplement the hardware processing units in order to give the system flexibility by providing additional functions. They are, for example, designed to be used to carry out particular, intricate tasks, which cannot be carried out by the hardware processing units 14.

In the embodiment described in FIG. 2, the transfer of data to and from the programmable processing units is carried out via the common memory 20. This memory 20 is produced in the form of a RAM memory. It incorporates all the delay lines necessary to carry out the video processes and, in particular, to carry out the processes on a sliding window. Therefore, in addition to the transfer of pixels to the programmable processing units, this memory is responsible for the processes using the delay lines.

Figure 3:
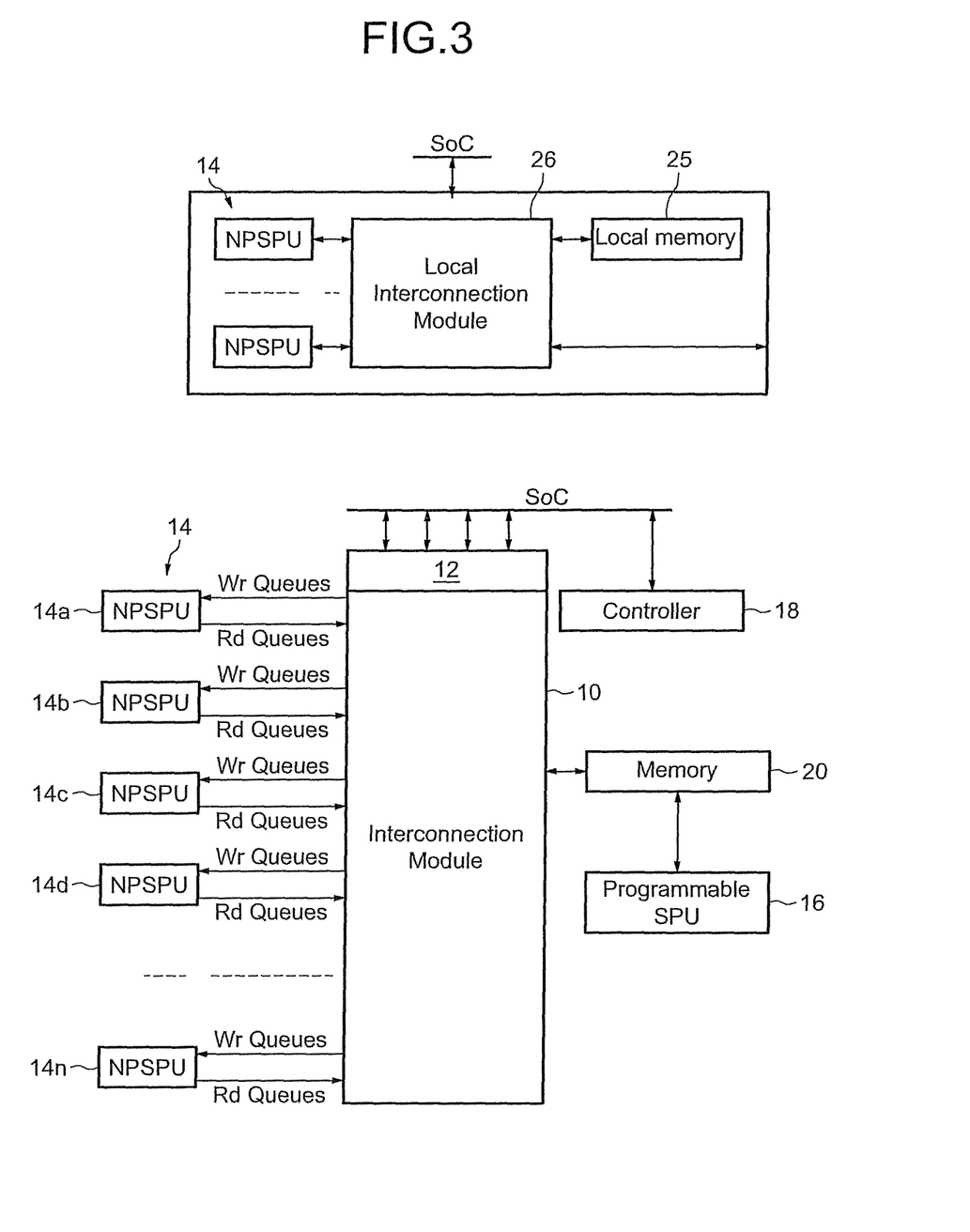
FIG. 3 illustrates the detailed architecture of the system of FIG. 2.

With reference to FIG. 3, the transfer of data between the interconnection module 10 and the processing units 14$a$, ... 14$n$ is carried out in the form of data transfer queues, either from the module 10 to the processing units 14 "WRQueues," or from the processing units to the module 10 "RDQueues." But it may be noted that, with respect to the processing of video signals, the processes applied within the processing units, and in particular within the hardware processing units, are faster than the frequency of the video signals themselves, even in high definition.

It has specifically been noted that a frequency of 75 MHz was sufficient for the processing of one line of an HD video frame. The processing units, for their part, are capable of processing a frequency of the order of 350 MHz. This is why, advantageously, the processing units are used to carry out several computations at the same time and are capable of receiving several data queues in parallel WrQueues and RDQueues. They may also be responsible for processing in parallel several pixel streams in order to deliver, as an output, a stream of processed pixels.

In one embodiment, the transfer of data between the interconnection module 10, on the one hand, and the processing units 14a, ... 14n, on the other hand, is carried out according to a "handshake" protocol, that is to say a protocol according to which a transmitter ensures that a receiver is in a state to receive data before transferring to it. Such a protocol is based on the prior transmission of a request and on the receipt of a validation signal during data transmission in order to notify the transmitter of the request that the transmitted data are valid.

Therefore, for the transmission of pixels to the processing units, the interconnection module transmits a validation signal to a processing unit after the receipt, from the latter, of a request. Conversely, in order to receive pixels from a processing unit, the interconnection module 10 transmits a request to this unit and then retrieves the pixels, the received data being considered valid when the valid signal is received.

Moreover, in addition to the signals of this "handshake" protocol, the interconnection module transfers additional signals "ActiveFlag" and "PixelFlag" during the transfer of the pixels in order, in particular, to manage the enabling of the processing units, on the one hand, and to configure their operating mode on the other hand. First, the "ActiveFlag" signal is used to disable the processing units that are not used. This flag is transmitted with the first pixel or pixels transmitted. Because the processing units operate under the sole supervision of the interconnection module 10, if a processing unit does not receive such a flag, it is not used and can then be disabled.

Figure 4:
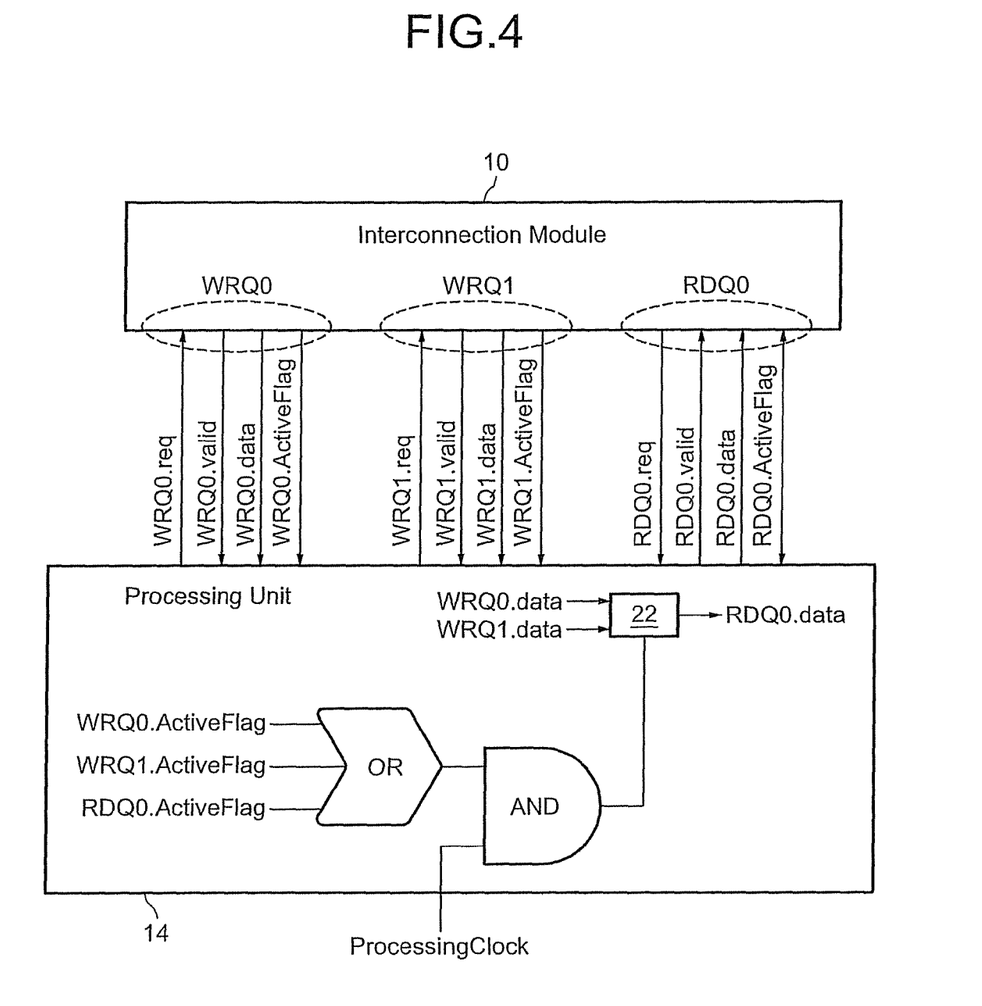
FIG. 4 shows an example of the controller for the slave processing units of the system of FIG. 2.

FIG. 4 represents an exemplary embodiment in which a processing unit receives two pixel streams in order to deliver a processed pixel stream as an output. For example, the interconnection module 10 transfers the read and write signals WRQ0, WRQ1 and RDQ0, in this instance the signals WRQ0req, WRQ1req and RDQ0req, with respect to the pixel transfer request, the pixel signals, in this instance WRQ0data, WRQ1data and RDQ0data, and the validation signals, in this instance WRQ0.valid, WRQ1.valid and RDQ0.valid.

In addition to these signals, the interconnection module 10 transmits the enable signals for each data queue, namely the signals WRQ0.ActiveFlag, WRQ1.ActiveFlag and RDQ0.ActiveFlag, which are used to generate an internal clock signal "InternalProcessingClock" for the internal processor 22 of the processing unit. For example, a logic OR function is carried out between the flags WRQ0.ActiveFlag, WRQ1.ActiveFlag and RDQ0.ActiveFlag, and a logic AND function is carried out between the output of the OR function and an external clock signal "ProcessingClock" in order to generate the internal clock signal "InternalProcessingClock." Moreover, for the purpose of improving the number of physical interfaces between the interconnection module and the processing units, the processing units that are not working simultaneously are grouped together.

Figure 5:
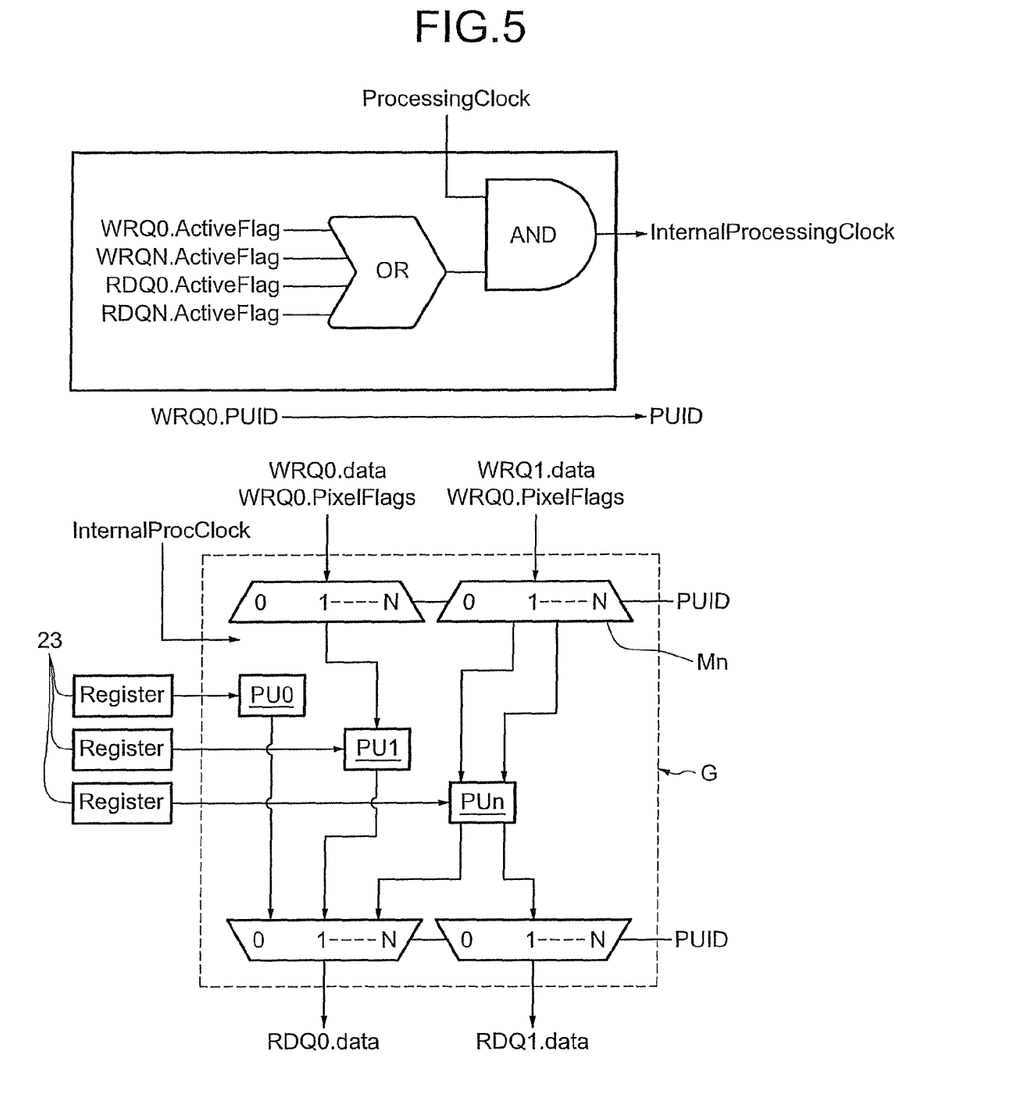
FIG. 5 illustrates an example of a grouping of the slave processing units of the system of FIG. 2.

As can be seen in FIG. 5, it is then possible to configure groups, such as G, of processing units, which are themselves capable of interchanging one or more data queues. In the exemplary embodiment illustrated in FIG. 5, the group of processing units comprises any number n of processing units PU0, . . . PUn. In this case, in addition to the flags "ActiveFlag"WRQ0.ActiveFlag, WRQN.ActiveFlag, and RDQ0.ActiveFlag, RDQN.ActiveFlag designed for the generation of the internal clock signal "InternalProcessingClock," as mentioned above, the stream of data interchanged with the processing units incorporates a configuration parameter PUID of each processing unit. Therefore, for example, the configuration signal PUID may be positioned at 1 in order to configure the group of processing units as an adder or at 1 in order to configure the group of processing units as a multiplier.

As illustrated in FIG. 5, the group of processing units arbitrarily selects the configuration signal carried by one of the queues that it receives, for example, the queue WRQ0. Each processing unit PU0, PU1, PUn is associated, as an input and as an output, with a multiplexer M1, Mn, itself controlled by the configuration signal "PUID" generated from a parameter WRQ0.PUID transferred with the pixels in order to control, jointly with control registers such as 23 of the processing units, the operating mode of the group of processing units.

It may be noted that it is also possible to group the processing units together in order to simplify the programming, to obtain a gain in power. For example, the specific resources for a given algorithm are grouped together. It is therefore possible, as illustrated in FIG. 3, to associate in parallel several processing units which are themselves associated with local interconnection modules 26 and with a local memory 25.

Figure 6:
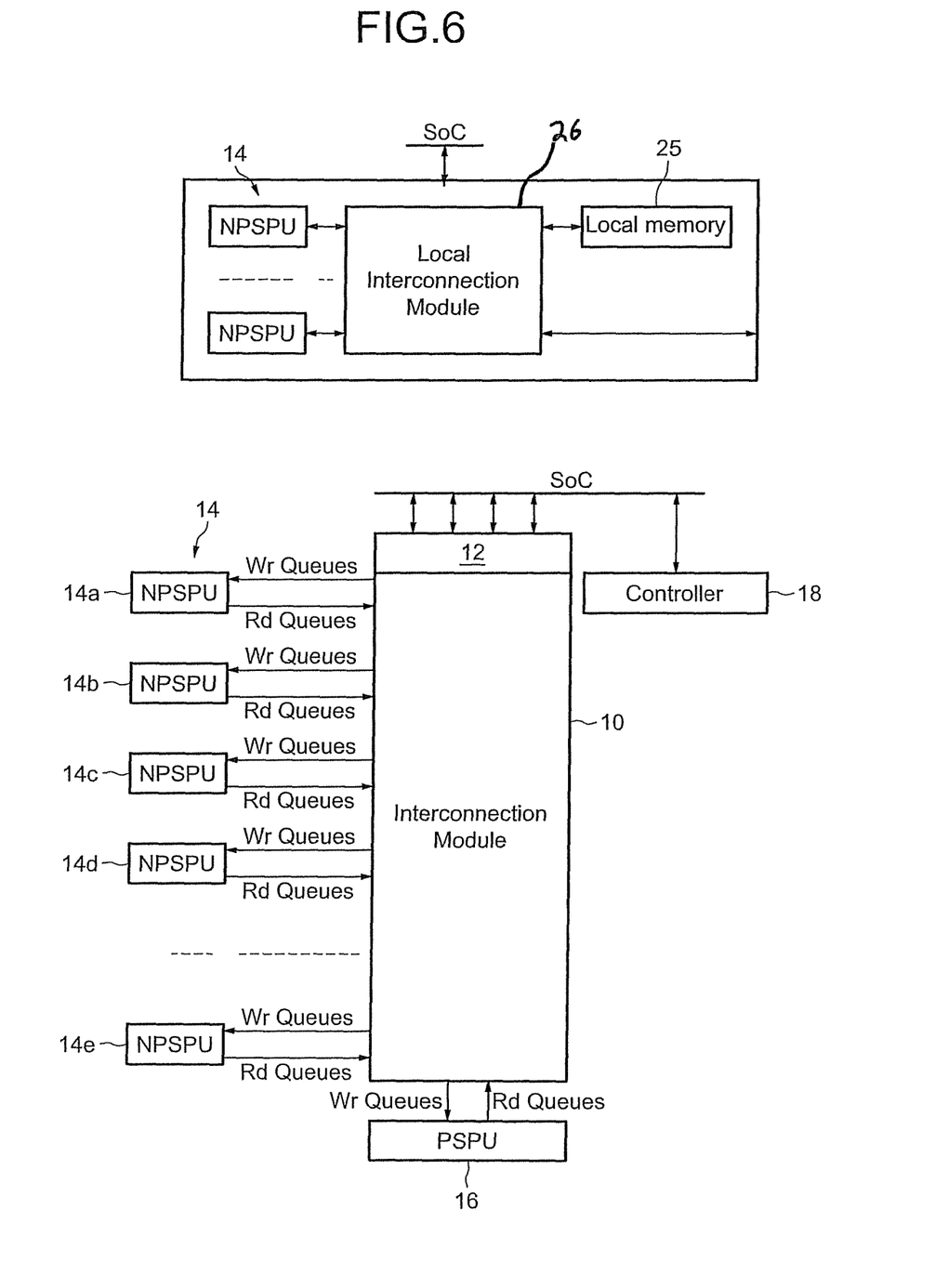
FIG. 6 shows another embodiment of a system for processing digital data, according to the present invention.

It may be noted that, in the various embodiments illustrated, the transfer of data from the interconnection module to the programmable processing units 16 is carried out via the on-board memory RAM. It is also possible, as another embodiment, as can be seen in FIG. 6, instead of using the shared memory, to use a memory that is internal to each processing unit 16. It is also possible, as another embodiment, to transfer the data directly to the programmable processing units by using a data transfer protocol based on the use of requests and of validation signals, similar to the protocol used for the transfer of data from the interconnection module to the hardware processing units.

Such an embodiment is of value because it makes it possible to obtain uniformity between the hardware processing units and the programmable processing units, and to improve the synchronization of the programmable processing units because the data transfer is carried out directly, without passing through the memory RAM. It may however be noted that this embodiment may have a drawback relating to reduced flexibility because the data stream transmitted to the processing units 16 is then fixed.

That which is claimed:

1. A system-on-chip (SoC) comprising:
    a set of slave processing units comprising programmable slave processing units each configured to execute a programmable video processing function and non-programmable hardware slave processing units each configured to execute a non-programmable pixel processing function;
    a data transfer SoC network;
    an interconnection module configured to communicate with said data transfer SoC network and to transfer data between said set of slave processing units and said data transfer SoC network; and
    a controller configured to control the data transfer.

2. The SoC according to claim 1 wherein the functions comprise video processing functions on a plurality of parallel video input data streams.

3. The SoC according to claim 1 further comprising a shared memory associated with said programmable slave processing units.

4. The SoC according to claim 3 wherein said shared memory comprises a memory internal to said programmable slave processing units.

5. The SoC according to claim 1 wherein said interconnection module is configured to disable slave processing units not in demand.

6. The SoC according to claim 5 wherein said interconnection module is configured to insert into a signal transmitted to one of said set of slave processing units an active flag for a transaction in progress, and disable the slave processing unit if there is no active flag in the transmitted signal.

7. The SoC according to claim 1 wherein said set of slave processing units is organized in groups having stages with non-simultaneous action; and further comprising a multiplexer coupled to the groups of slave processing units.

8. The SoC according to claim 7 wherein said interconnection module is configured to insert into a signal transmitted to each slave processing unit a configuration signal of the respective group.

9. The SoC according to claim 1 further comprising at least one other set of slave processing units operating in parallel with said set of slave processing units.

10. A satellite television signal decoder comprising:
   a set of slave processing units comprising programmable slave processing units each configured to execute a programmable video processing function and non-programmable hardware slave processing units each configured to execute a non-programmable pixel processing function;
   a data transfer network;
   an interconnection module configured to communicate with said data transfer network and to transfer data between said set of slave processing units and said data transfer network; and
   a controller configured to control the data transfer.

11. The satellite television signal decoder according to claim 10 wherein the functions comprise video processing functions on a plurality of parallel video input data streams.

12. The satellite television signal decoder according to claim 10 further comprising a shared memory associated with said programmable slave processing units.

13. The satellite television signal decoder according to claim 10 wherein said interconnection module is configured to disable slave processing units not in demand.

14. The satellite television signal decoder according to claim 13 wherein said interconnection module is configured to insert into a signal transmitted to one of said set of slave processing units an active flag for a transaction in progress, and disable the slave processing unit if there is no active flag in the transmitted signal.

15. The satellite television signal decoder according to claim 10 wherein said set of slave processing units is organized in groups having stages with non-simultaneous action; and further comprising a multiplexer coupled to the groups of slave processing units.

16. The satellite television signal decoder according to claim 10 further comprising at least one other set of slave processing units operating in parallel with said set of slave processing units.

17. A system-on-chip (SoC) comprising:
   a set of slave processing units configured to execute video processing functions on a plurality of parallel video input data streams, and generate a combined video data stream from the plurality of parallel input data streams;
   a data transfer SoC network;
   an interconnection module configured to communicate with said data transfer SoC network and to transfer data between said set of slave processing units and said data transfer SoC network; and
   a controller configured to control the data transfer.

18. The SoC according to claim 17 further comprising a shared memory associated with said set of slave processing units.

19. The SoC according to claim 18 wherein said shared memory comprises a memory internal to said set of slave processing units.

20. The SoC according to claim 17 wherein said interconnection module is configured to disable slave processing units not in demand.

21. The SoC according to claim 20 wherein said interconnection module is configured to insert into a signal transmitted to one of said set of slave processing units an active flag for a transaction in progress, and disable the slave processing unit if there is no active flag in the transmitted signal.

22. The SoC according to claim 17 wherein said set of slave processing units is organized in groups having stages with non-simultaneous action; and further comprising a multiplexer coupled to the groups of slave processing units.

23. The SoC according to claim 22 wherein said interconnection module is configured to insert into a signal transmitted to each slave processing unit a configuration signal of the respective group.

24. The SoC according to claim 17 further comprising at least one other set of slave processing units operating in parallel with said set of slave processing units.

25. A satellite television signal decoder comprising:
   a set of slave processing units configured to execute video processing functions on a plurality of parallel video input data streams, and generate a combined video data stream from the plurality of parallel input data streams;
   a data transfer network;
   an interconnection module configured to communicate with said data transfer network and to transfer data between said set of slave processing units and said data transfer network; and
   a controller configured to control the data transfer.

26. The satellite television signal decoder according to claim 25 further comprising a shared memory associated with said set of slave processing units.

27. The satellite television signal decoder according to claim 25 wherein said interconnection module is configured to disable slave processing units not in demand.

28. The satellite television signal decoder according to claim 27 wherein said interconnection module is configured to insert into a signal transmitted to one of said set of slave processing units an active flag for a transaction in progress, and disable the slave processing unit if there is no active flag in the transmitted signal.

29. The satellite television signal decoder according to claim 25 wherein said set of slave processing units is organized in groups having stages with non-simultaneous action; and further comprising a multiplexer coupled to the groups of slave processing units.

30. The satellite television signal decoder according to claim 25 further comprising at least one other set of slave processing units operating in parallel with said set of slave processing units.

* * * * *